(12) United States Patent
Blank et al.

(10) Patent No.: US 10,684,610 B2
(45) Date of Patent: Jun. 16, 2020

(54) METHOD AND SYSTEM FOR USE IN CONNECTION WITH AN INDUSTRIAL CONTROL SYSTEM

(71) Applicant: ABB Schweiz AG, Baden (CH)

(72) Inventors: Frederik Blank, Heilbronn (DE); Josef Bicik, Mannheim (DE)

(73) Assignee: ABB SCWEIZ AG, Baden (CH)

( * ) Notice: Subject to any disclaimer, the term of this patent is extended or adjusted under 35 U.S.C. 154(b) by 355 days.

(21) Appl. No.: 15/111,828

(22) PCT Filed: Dec. 15, 2014

(86) PCT No.: PCT/EP2014/077694
§ 371 (c)(1),
(2) Date: Jul. 15, 2016

(87) PCT Pub. No.: WO2015/106894
PCT Pub. Date: Jul. 23, 2015

(65) Prior Publication Data
US 2016/0334781 A1    Nov. 17, 2016

(30) Foreign Application Priority Data
Jan. 16, 2014    (EP) .................................... 14151394

(51) Int. Cl.
*G05B 11/01*    (2006.01)
*G05B 19/418*    (2006.01)
*G05B 23/02*    (2006.01)

(52) U.S. Cl.
CPC ..... *G05B 19/4184* (2013.01); *G05B 23/0216* (2013.01); *G05B 23/0267* (2013.01);
(Continued)

(58) Field of Classification Search
CPC ...... G05B 19/4184; G05B 2219/31437; G05B 2219/32128; G05B 23/0216; G05B 23/0267
See application file for complete search history.

(56) References Cited

U.S. PATENT DOCUMENTS 6,075,530 A * 6/2000 Lucas ................... G06F 16/287
715/804
8,321,806 B2    11/2012 Agrusa et al.
(Continued)

FOREIGN PATENT DOCUMENTS

EP          2560085 A1    2/2013
WO    WO 2008039352 A2    4/2008

*Primary Examiner* — Zhipeng Wang
(74) *Attorney, Agent, or Firm* — Leydig, Voit & Mayer, Ltd.

(57) ABSTRACT

An industrial control system (ICS) frontend system has a visualization component that concurrently visualizes a functional ICS view (FICSV) and further functional view (FFV). The FICSV represents ICS data associated with the ICS. The FFV is either a further FICSV representing ICS data or is a functional GIS view representing GIS data associated with a geographic information system. The functional views can respond to an associating event. The system further has a data input component configured to receive user input data, the input data indicating a directed associating operation (DAO) between the FICSV and FFV. A system processor component launches the associating event in response to received input data if the DAO is allowed. If the DAO is from an FFV object to the FICSV, the FICSV function is performed using FFV object properties; if from an FICSV ICS object to the FFV, the FFV function uses ICS object properties.

18 Claims, 7 Drawing Sheets

(52) U.S. Cl.
CPC .............. *G05B 2219/31437* (2013.01); *G05B 2219/32128* (2013.01)

(56) References Cited

U.S. PATENT DOCUMENTS

| | | | |
|---|---|---|---|
| 2007/0043538 A1* | 2/2007 | Johnson | G06Q 30/08 702/188 |
| 2009/0210814 A1* | 8/2009 | Agrusa | G05B 23/0267 715/772 |
| 2010/0082129 A1* | 4/2010 | McGreevy | G06Q 10/06 700/80 |
| 2010/0123594 A1* | 5/2010 | Schleiss | G05B 23/0272 340/679 |
| 2010/0156654 A1* | 6/2010 | Bullemer | G05B 23/0272 340/691.6 |
| 2011/0029102 A1* | 2/2011 | Campney | G05B 15/02 700/83 |
| 2013/0097544 A1* | 4/2013 | Parker | G09B 29/003 715/771 |
| 2013/0208001 A1* | 8/2013 | Lulue | H04W 4/029 345/629 |

* cited by examiner

300

| Id | Tag Name | GIS Id | GIS Layer |
|---|---|---|---|
| 123 | PV-TAG-01 | 1 | pumps |
| 124 | PV-TAG-02 | 2 | pumps |
| 125 | PV-TAG-03 | 3 | pumps |
| 126 | PV-TAG-04 | 2 | sensors |
| 127 | DI-TAG-01 | 4 | sensors |
| 128 | DI-TAG-02 | 6 | sensors |
| 129 | DI-TAG-03 | 8 | sensors |

| Object Type | Sub Type | View | Associating Action | Default |
|---|---|---|---|---|
| ICS Object | Analog | GIS Map | Zoom To | TRUE |
| ICS Object | Digital | GIS Map | Highlight | FALSE |
| GIS Object | Pump | Alarm List | Filter | TRUE |
| GIS Object | Meter | Process Graphics | Highlight | TRUE |

METHOD AND SYSTEM FOR USE IN CONNECTION WITH AN INDUSTRIAL CONTROL SYSTEM

CROSS-REFERENCE TO RELATED APPLICATIONS

This application is a U.S. national stage application under 35 U.S.C. § 371 of International Application No. PCT/EP2014/077694, filed on Dec. 15, 2014, and claims benefit to European Patent Application No. 14 151 394.5, filed on Jan. 16, 2014. The International Application was published in English on Jul. 23, 2015, as WO 2015/106894 A1 under PCT Article 21(2).

FIELD

The present invention generally relates to electronic data processing, and more particularly, relates to methods, computer program products and systems for flexible operation of an industrial control system (ICS).

BACKGROUND

ICS systems include so-called supervisory control and data acquisition systems (SCADA) and so-called distributed control systems (DCS). ICS systems typically monitor and control distributed field devices in, for example, electrical power grids, electrical power plants, environmental control, oil refining plants, chemical plants, pharmaceutical manufacturing, sensor networks, water management systems, traffic management, etc. A SCADA system operates with coded signals over communication channels so as to provide control of remote equipment using typically one communication channel per remote station. The SCADA system may be combined with a data acquisition system by adding the use of coded signals over communication channels to acquire information about the status of the remote equipment for display or for recording functions. DCS systems are computer-based systems that monitor and control industrial processes that exist in the physical world. SCADA systems are typically designed as being large-scale processes that can include multiple sites, and large distances. These processes include industrial, infrastructure, and facility-based processes, such as industrial processes (e.g., manufacturing, production, power generation, fabrication, and refining) which may run in continuous, batch, repetitive, or discrete modes, infrastructure processes which may be public or private (e.g., water treatment and distribution, wastewater collection and treatment, oil and gas pipelines, electrical power transmission and distribution, wind farms, civil defense siren systems, and large communication systems), and facility processes which can occur both in public facilities and private ones (e.g., buildings, airports, ships, and space stations) for monitoring and controlling heating, ventilation, and air conditioning systems (HVAC), access, and energy consumption.

For operating and maintaining such ICS (SCADA/DCS) systems it can be important to quickly identify ICS components in the real world (real world objects) or to quickly retrieve information about the technical status of real world objects. Finding the location of an ICS object on a Geographic Information System (GIS) map or in a process view is typically done by a user entering the respective object ID or name into a search box or selecting the object name from a predefined list. This user interaction pattern for object selection (e.g., using a mouse click, a double click, etc.) may in some cases be impractical as the default action may be used for other actions. Sometimes, it may be necessary to copy and paste the object IDs or names using a clipboard function.

Drag & drop technology is known from use cases, such as for example configuring an alarm display as disclosed in the European patent application EP2560085. For example, some known GIS applications support directed associating operations, such as for example drag and drop, drag and relate or multi-touch gestures on touch-screens, to add a new layer to a GIS view. In this context, traditionally, drag and drop like operations are used to add or place elements on a plan. However, performing such a drag and drop like functions between ICS objects and GIS objects or process objects to automatically execute a respective function is not supported by existing frontend systems used for operating industrial control systems.

SUMMARY

An aspect of the invention provides a frontend system communicating with an industrial control system, the system comprising: a visualization component configured to concurrently visualize a functional ICS view and a further functional view, the functional ICS view being representative of ICS data associated with the industrial control system, the further functional view being a further functional ICS view representative of ICS data associated with the industrial control system, or the further functional view being a functional GIS view representative of GIS data associated with a geographic information system, the functional views being configured to perform a function in response to an associating event; a data input component configured to receive input data from a user, the input data indicating a first and/or second directed associating operation between the functional ICS view and the further functional view; and a processor component configured to launch the associating event in response to the received input data if the directed associating operation is allowed, if the first directed associating operation is directed from at least one object of the further functional view to the functional ICS view, perform the function associated with the functional ICS view based on one or more properties of the at least one object of the further functional view, if the second directed associating operation is directed from at least one ICS object of the functional ICS view to the further functional view, perform the function associated with the further functional view based on properties of the at least one ICS object, and update visualization data of the functional views according to the performed function.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3A is a mapping data structure for associating objects of a functional source view and their respective properties with objects of a corresponding functional target view;

FIG. 3B is a further mapping data structure for associating object types of a functional source view with functions of the corresponding functional target view;

DETAILED DESCRIPTION

Figure 1:
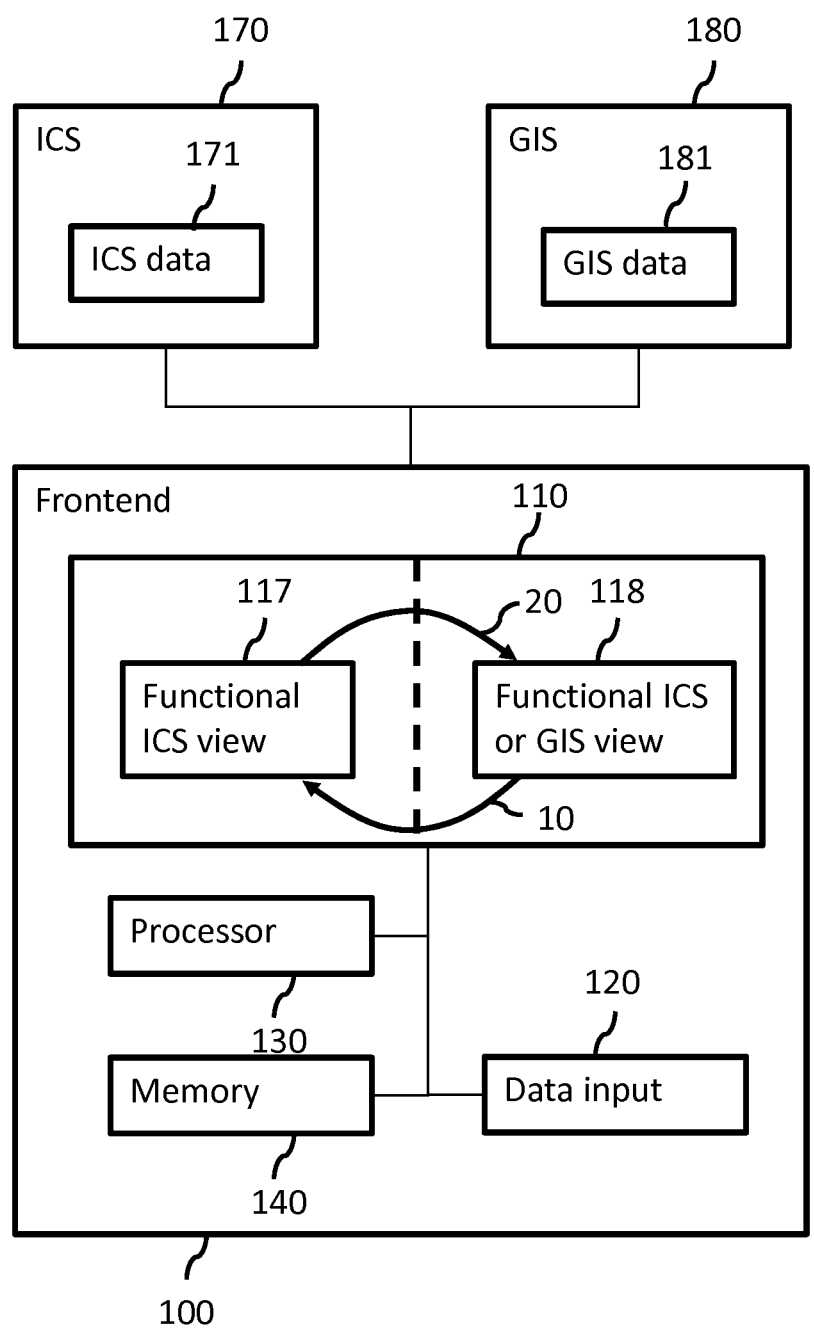
FIG. 1 is a simplified block diagram of a frontend system of an industrial control system according to an embodiment of the invention.

Therefore, in view of the Background, there is a need to improve such frontend systems of industrial control systems to provide more flexibility for handling user input data in relation to the identification of the physical location of ICS objects or their location in ICS process views and in relation to the retrieval of the technical status of representations of such ICS objects in a GIS view or process view.

Embodiments of the present invention as disclosed hereinafter propose a new way for interaction of a human operator (user) with an ICS (SCADA or DCS system) and an integrated GIS component or a process display which relates to the ICS. The embodiments include a frontend system of an industrial control system, a computer-implemented method for operating the frontend system and a computer program product having instructions that when loaded into a memory of the frontend system cause one or more processors of the system to execute the method.

The frontend system of the industrial control system (ICS) can be a separate computer system which is communicatively coupled with the ICS or it can be implemented as an integral part of the ICS. The frontend system allows a user to interact with the ICS. The interaction may serve different purposes, such as for example, control of the ICS, configuration of the ICS, maintenance of the ICS or the like.

The frontend system has a visualization component which is configured to concurrently visualize a functional ICS view and a further functional view. A functional view, as used hereinafter, is a software component which is configured to provide one or more views on data stored in an underlying system wherein the functional view also has one or more methods which can execute one or more functions in response to input data received by the functional view.

The functional ICS view is representative of ICS data associated with the industrial control system. In other words, the ICS includes data which relates to hard- and software-components of the ICS system or to any related information or property (e.g., field devices of the ICS, a group of field devices, a field bus, signals associated with the physical components, alarms being raised by such components, process components, etc.). Such ICS data can be visualized by the functional ICS view through ICS objects representing respective ICS data.

The further functional view either is a further functional ICS view which is also representative of ICS data associated with the industrial control system (e.g., an ICS process view) or it is a functional GIS view which is representative of GIS data associated with a geographic information system (GIS). GIS data typically describe a geographic area representing real physical locations. For example, GIS data can be visualized by the functional GIS view through GIS objects representing respective GIS data. For example, the physical area can be visualized based on the geo-coordinates of the respective physical locations. Real world objects can also be visualized as GIS objects according to their associated geo-coordinates.

The functional views (ICS functional view and further functional view) are configured to perform a function in response to an associating event. An associating event, as used hereinafter, is an event which can be launched by the frontend system in response to input data received from a user indicating an intention of the user to associate visualized objects and respective functional views. The associating event indicates that the user has tried to associate one or more objects of one of the functional views with the other functional view. For example, the user may perform a directed associating operation (e.g., drag and drop, multi-touch, etc.) by selecting one or more objects of one of the views and associating the selected objects with the other view. For this purpose the frontend system includes a data input component configured to receive input data from the user. The input data indicate the directed associating operation between the functional ICS view and the further functional view. Such a data input component can be implemented as a mouse device in which case the respective directed associating operation may be a drag and drop operation dragging the selected objects from one functional view and dropping them on the other functional view (or vice versa). The data input component can also be implemented as a multi-touch enabled touch screen. The user may select objects in one of the functional views by touching the objects of by performing a suitable selection gesture and then touch on the target view to indicate the directed association. Besides drag and drop operations or multi-touch operations other interaction paradigms (e.g., keyboard controlled operations, voice controlled operations, eye-tracking controlled operations, etc.) are possible and will be described in the detailed description.

Pressing a short cut or using multiple fingers on a tactile display while dragging & dropping an element to the GIS display and vice-versa may allow for multiple functions associated to the drag & dropping event.

Not all possible directed associating operations may be meaningful. The frontend system can store predefined allowed associations between objects of one functional view and the second functional view or rules for dynamically evaluating whether a directed associating operation is allowed or not. A processor component of the frontend system can then filter the received input data from the user and launch the associating event in response to the received input data only if the directed associating operation is allowed. In case the associating event is launched the processor component distinguishes between the two possible directions of the directed associating operation. Directed associating operation as used throughout this specification refers to an operation which associates objects of a first view (source view) with a second view (target view).

If the directed associating operation is directed from at least one object of the further functional view to the functional ICS view, the function associated with the functional ICS view is performed based on one or more properties of the at least one object of the further functional view. In other words, if the user selects one or more objects of the GIS view or further ICS view and associates the selected objects with the ICS view, then the processor component executes a function implemented for the ICS view which is applied to the ICS objects displayed in the ICS view. As used throughout this document a function associated with a functional view is equivalent to a function being assigned to the functional view.

If the directed associating operation is directed from at least one ICS object of the functional ICS view to the further functional view, the processor component performs the function associated with the further functional view based on properties of the at least one ICS object. In other words, if the user selects one or more objects of the ICS functional view and associates the selected objects with the further functional ICS view or the GIS functional view, then the processor component executes a function implemented for the respective further functional view which is applied to the respective further functional view objects (GIS objects or ICS objects dependent on which further functional view is used) displayed in the further functional view.

Finally, the processor component updates the visualization data of the functional views according to the performed function providing the result of the performed function to the user. As a result, the accessibility to data about the technical status of ICS components is improved which allows an improved control or maintenance of the ICS.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

Figure 2:
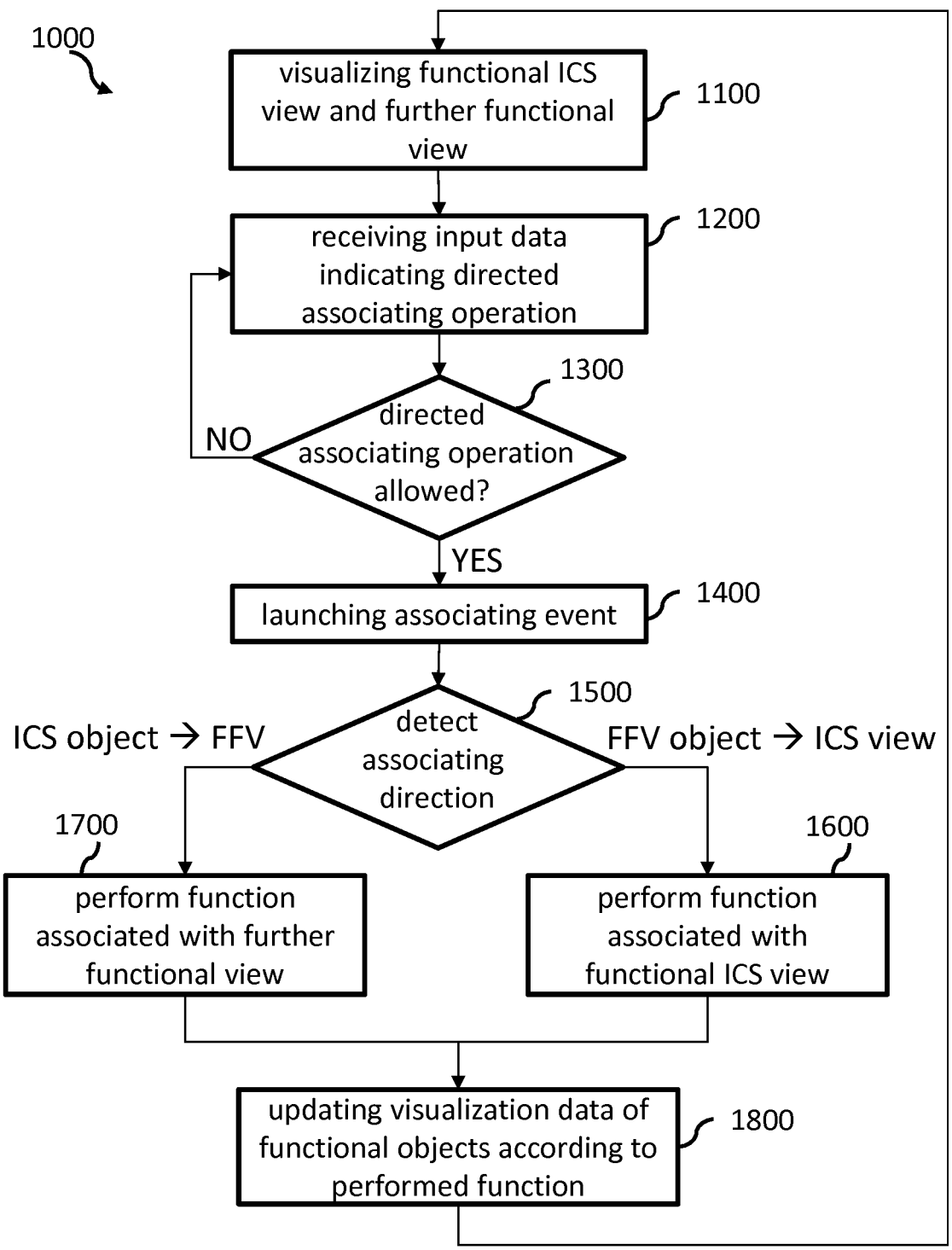
FIG. 2 is a simplified flow chart of a computer-implemented method for operating the frontend system according to an embodiment of the invention.

FIG. 1 is a simplified block diagram of a frontend system 100 of an industrial control system 170 according to an embodiment of the invention. The operation of the frontend system 100 is detailed in FIG. 2, which is a simplified flow chart of a computer-implemented method 1000 for operating the frontend system according to an embodiment of the invention. Therefore, FIG. 1 will be described in the context of FIG. 2 using the respective reference numbers.

The frontend system 100 is communicatively coupled with the ICS 170. For example, the two systems can be connected through a network (e.g., a local area network or a wireless network) or the frontend system 100 can be implemented as an integral part of the ICS 170 and thereby use hardware components of the ICS (e.g., memory, processor, I/O means) for its own purposes. In the following, the frontend system 100 is described as a stand-alone system having its own I/O means 110, 120, processor 130 and memory 140. However, a person skilled in the art can easily implement the described functions as integral part of the ICS 170 making use of the respective hardware components.

The frontend system 100 has a visualization component 110 (as part of the I/O means) which serves as a display means for displaying system information to the user. Any appropriate display technology can be used. The visualization component 110 concurrently visualizes 1100 a functional ICS view 117 and a further functional view 118. For example, the two views may be implemented as two sections in a split window, in two independent windows, in two separated areas of an HTML page or in any other appropriate format which is suitable to illustrate two visually separated areas for a user.

The functional ICS view 117 is representative of ICS data 171 associated with the ICS 170. Examples of ICS data 171 include but are not limited to: data that relates to field components such as sensors or valves, signals associated with such field components such as alarm signals, events being associated with the field components, control elements for the field components such as acknowledge control elements, etc. Different views on the ICS data 171 can provide different information about the technical status of the ICS 170 (e.g., the technical status of components controlled by the ICS). For example, the functional ICS view may include objects representing at least a sub-set of alarm signals which have been raised by respective field components. In another example, the functional ICS view may include objects representing the field components of the ICS 170, e.g. in a hierarchical grouping. A person skilled in the control of ICS systems can define more functional ICS views which are appropriate in the context of controlling and monitoring the ICS 170.

The further functional view 118 is either a further functional ICS view which is representative of ICS data associated with the industrial control system 170 or a functional GIS view which is representative of GIS data 181 associated with a geographic information system 180.

For example, a further functional ICS view 118 can be a process view including process objects representing ICS data reflecting process flows occurring during the operation of the ICS 170 and an associated function can be a zoom function zooming into process objects which are of special interest in the context of a particular user input.

For example, a functional GIS view 118 can include the visualization of an area map including graphical objects representing GIS data 181 associated with particular geo-coordinates. For example, a graphical object representing a particular sensor of the ICS can be displayed in accordance with its geo-coordinates at the respective location in the area map. A function of the functional GIS view 118 can be a zoom function zooming into area map to enlarge the visualization of the area around a location of specific interest indicated by a particular user input. Another function of the functional GIS view can be a highlighting function or a filter function to highlight or filter objects of the functional GIS view in response to received user input data. The skilled person can provide more associated functions for the functional GIS view which are useful in the context of monitoring and controlling the ICS 170.

The functional views 117, 118 are configured to perform 1600, 1700 a respective function in response to an associating event. The associating event is launched 1400 in response to input data received from the user if the input data indicate a directed associating operation 10, 20 between the functional ICS view 117 and the further functional view 118 and the directed associating operation is allowed. In the example operation 10 is directed from functional view 117 to further functional view 118; and operation 20 is directed from the further functional view 118 to the functional view 117. For this purpose the frontend system 100 has a data input component 120 which is configured to receive 1200 or capture input data from the user reflecting the user's intention to associate one or more objects of one of the functional views with the other functional view. This is achieved by detecting a directed associating operation 10, 20 which, for example, can be implemented as a drag and drop operation, a multi-touch operation, a keyboard controlled operation, a voice controlled operation, or an eye-tracking controlled operation. Drag and drop and multi-touch operation have already been explained earlier. Alternatively, key inputs including shortcut combinations of keys from a classical keyboard can be used by the user to select objects of one view and associate the selected objects with the other view. Eye tracking techniques exist where a user can perform the respective directed associating operation by staring at the objects to be selected and then at the target view. Alternatively, voice commands may be used by the user (e.g., "move alarm x to GIS view") to perform the directed associating operation. There can be a default function associated with each functional target view which is performed in response to the directed associating operation. In other embodiments, there may be multiple functions associated with a particular functional target view. In such a case, the system may prompt the user with a list of functions available for the allowed directed associating operation and receive user selection input data from the user. For example, the list may be presented in a pop-up window or in any other appropriate user interface design which allows the user to select the intended function form the list. In another embodiment, the target view may provide graphical representations of the available functions in the functional target view. For example, an first icon can indicate a zoom function, a second icon a pan function, a third icon a highlight function, a forth icon a filter function, etc. In response to the selected objects of the source functional view the system may highlight the icons representing allowed functions for the respective directed associating operation. When the user directs the associating operation to a respective icon the functional target view can perform the corresponding function. In another embodiment, the to-be-performed function can be automatically selected from a plurality of functions associated with the functional target view based on properties (e.g., object types) of the objects selected in the functional source view and the properties (e.g., view type) of the functional target view. In other embodiments, for example, pressing a short cut or using multiple fingers on a tactile display while dragging & dropping an element to the GIS display and vice-versa may allow for determining the particular function out of multiple functions associated with the target view.

The frontend system 100 can check 1300 via a processor component 130 whether the received input data correspond to an allowed directed associating operation or not. In case the operation is not allowed the system waits for further input data to be received from the user. Otherwise the associating event is launched 1400. Launching the associating event 1400 includes any logic implemented in the frontend system which is able to detect an allowed directed associating operation and trigger some function in response. The check 1300 can be executed by a compare function which is able to compare the received input data with predefined directed associating operation patterns. For example, a mapping table can be used to define relations between types of objects of the source view and types of target views. For example, ICS objects having an alarm type can be mapped to a GIS view having an area map type. GIS objects having a field component type can be mapped to an ICS view having an alarm list type. Associations between ICS components having a process component type and a GIS view of type area map may not be meaningful or not feasible from a technical point of view. Therefore, a corresponding associating operation may not be allowed. Such mapping for defining allowed associations between objects and views can be defined in tables, pointer structures or in separate logic or in any other way suitable to store such predefined allowed assignments. FIGS. 3A, 3B illustrate examples of data structures which can be used to implement corresponding mappings.

It is to be noted that at any time the directed associating operation can be directed from objects of the functional ICS view 117 to the further functional view 118 (directed associating operation 20) or from objects of the further functional view 118 (abbreviated as FFV in FIG. 2) to the functional ICS view 117 (directed associating operation 10). In response to the associating event the frontend system 100 then checks 1500 the associating direction and subsequently executes the corresponding function associated with the target view. In other words, the interaction between the functional ICS view 117 and the further functional view 118 is mutual which provides improved flexibility in controlling and monitoring the ICS 170. The processor component implements a check function which is configured to detect 1500 the direction of the directed associating operation.

If the directed associating operation 10 is directed from at least one object of FFV 118 to the functional ICS view 117, the processor component 130 executes instructions to perform 1600 the function associated with the functional ICS view 117 based on one or more properties of the at least one object of the further functional view 118. For example, the functional ICS view 117 can be an alarm list which includes a list of representations of alarms which were raised by components of the ICS system. The further functional view 118 can be a functional GIS view representing an area map including at least one GIS object which indicates the location of one or more corresponding ICS objects. For example, the area map can include graphical symbols (ICS objects) which are representative of one or more components of the ICS 170 and which are placed in the area map according to the geo-coordinates of the respective components of the ICS. The performed function associated with the alarm list (functional ICS view) can be an alarm filter function configured to filter out elements of the alarm list which are not associated with signals belonging to the one or more corresponding ICS objects. This example embodiment is described in more detail in FIG. 5.

If the directed associating operation 20 is directed from at least one ICS object of the functional ICS view 117 to FFV 118, the processor component 130 executes instructions to perform 1700 the function associated with the further functional view 118 based on properties of the at least one ICS object. For example, the functional ICS view 117 can be again an alarm list which includes a list of representations of alarms which were raised by components of the ICS system. For example, the further functional view 118 again can be an area map based on the GIS data 181 covering at least a part of the area where the at least one ICS object is located. The performed function associated with the area map can be a zoom function configured to zoom into the area around the location of the at least one ICS object. Once the one or more elements are associated with the functional GIS view, the properties of the selected alarm elements (ICS objects) can include the geo-coordinates of the ICS components which originally raised the alarms. The geo-coordinates can then be used by the zoom function of the functional GIS view to zoom into the area map by focusing the map around the geo-coordinates associated with the selected ICS objects and automatically adjust the enlargement of the area around the selected ICS objects. For example, if only one alarm element is dragged to the functional GIS view the zoom factor may be higher than in cases where multiple alarm elements are dragged. More details regarding this example embodiment are described in the context of FIG. 4.

Another example embodiment for a directed associating operation 20 which is directed from at least one ICS object of the functional ICS view 117 to FFV 118 can relate to a GIS FFV 118 representing again an area map based on the GIS data 181 covering at least a part of the area where the at least one ICS object is located and the performed function associated with the area map can be a visualizing filter function configured to filter out objects from the area map which are not relevant to the at least one ICS object in the context of its properties. For example, when a plurality of alarm elements of the functional ICS view is dragged to the GIS view GIS objects not being relevant to the dragged ICS objects may become invisible so that they disappear from the map. This can improve user-computer interaction as the likelihood that the user performs incorrect actions is reduced.

Each functional view 117, 118 may support a plurality of associated functions. As described earlier, each functional view can be associated with a default function. Further, the to-be-preformed function of the functional target view can be determined automatically based on the view object types of the selected view objects of the functional source view and, for example, the type of the functional target view or the object type(s) of the view objects in the functional target view. For example, functions which make no sense for the particular directed associating operation can be filtered out. If only one function of the target view matches the particular associating operation, this function may be determined and executed fully automatically by the system. Where more functions are meaningful the functional target view can prompt the user (e.g., by displaying a simple context menu/popup dialog) for the function to be performed. Alternatively, the functional target view can offer some drop areas (toolbar, buttons, icons, etc.) which determine the function to be performed.

For example, the technical properties associated with the view objects selected in the functional source view can then determine which functions are executable by the target view. For example, if the object properties relate to geo-coordinates of a single source view object an allowed function of a target GIS view can be a zoom function as explained earlier. If the object properties relate to geo-coordinates of multiple source view objects, the allowed function may be a zoom function combined with a pan function panning the map from the location of one source view object to the location of the next source view object and so on. The person skilled in the art can foresee further associations of properties and allowed to-be-performed functions. Some more examples will be given in the context of the following example embodiments.

Once the function associated with the respective target view has been performed the frontend system 100 automatically updates 1800 the visualization data of the functional views 117, 118 according to the performed function to convey the result of the performed function to the user via the visualization component 110.

FIGS. 3A and 3B illustrate mapping data structures for defining allowed directed associating operations and determining corresponding functions of the target functional view. The examples show tables as implementations of such mapping data structures. However, a person skilled in the art can use any other appropriate mapping data structure (e.g., pointers, ontologies, XML files, rule database, etc.).

FIG. 3A illustrates a mapping data structure 300 implemented by way of example as a mapping table. The mapping data structure 300 implements a first mapping stage between an ICS functional view and a GIS functional view. Each mapping is defined by a unique mapping identifier (column 310). In the column Tag Name 320 identifiers of ICS objects, such as for example alarms or field components, etc. are stored. Each mapping relates such an identifier of an ICS object (tag) with an entry in the column 340 GIS Layer associated with a GIS (object) ID 330. GIS ID plus GIS Layer can be seen as a combined primary key. A GIS Layer corresponds to an object type of a GIS view object. The term GIS layer is used in commercial GIS systems, such as for example, the ArcGIS Platform offered by Esri (Redlands, Calif.), to describe a view object type. It is to be noted that a person skilled in the art may define a different mapping data structure achieving the same purpose of mapping ICS objects to GIS object types.

For example, a first GIS Layer may relate to GIS object type pumps, a second GIS Layer may relate to GIS object type sensors. Further GIS Layers may relate to GIS object type pipe, etc. Each GIS Layer can be associated with a particular graphical representation for objects of this type. For example, meters may be represented by bullet points, pumps by squares and pipes by lines. In other words, the first mapping stage as defined by the mapping data structure 300 defines meaningful associations between ICS view objects and GIS view object types. If the user selects an arbitrary ICS object in the ICS functional view and drags and drops it onto the GIS view the respective directed association operation is allowed if a corresponding mapping is defined in the mapping data structure 300. For example, if a mapping exists which maps a particular field component (e.g., a pump) to a corresponding GIS Layer (e.g., GIS object type pumps), then directed associating operation involving the corresponding objects and views is allowed. The same is valid into the other direction. If one or more mappings exists between a GIS Layer and one or more Tag Names, dragging and dropping a corresponding GIS object to the ICS view is also allowed. A person skilled in the art can define such mappings for any intended relation between ICS objects and GIS object types, and for any intended relation between ICS objects and ICS process view object types. An example for an ICS process functional view is disclosed in FIG. 6.

FIG. 3B is a further mapping data structure 400 for associating object types 410, 420 of a functional source view with functions 440 of the corresponding functional target view 430. Once the frontend system has determined that a particular directed associating operation is allowed (e.g., by applying the mapping data structure of FIG. 3A) a particular associating event is launched in response. The associating event triggers the execution of a particular function associated with the target functional view. As explained earlier, a default function may be performed. However, in cases where the target functional view supports more than one function, the function which fits the particular directed associating operation needs to be determined. As disclosed earlier, various embodiments can be used where the user finally determines or selects the appropriate function from a list of options provided to the user. However, in some embodiments the frontend system may determine the appropriate function automatically based on the further mapping data structure 400. The example shows a table implementation for the further mapping data structure. However, as described for the mapping data structure 300 any other appropriate data format can be used.

The table 400 has an object type column 410 which stores potential object view types of the source functional view. Optionally, the object type 410 can be further divided into sub types 420 which can be divided into sub-sub types, etc. Further, the functional target view column View 430 stores potential view types for the functional target view. The function column 440 (Associating Action) stores a function name of the function which is to be performed by the functional target view if the mapping condition defined in a data record of the further mapping data structure 400 is met. The column Default 450 can include a Boolean value to indicate if the function in column 440 is to be used as a default function for the respective functional target view (TRUE) or not (FALSE).

In the example, if an analog ICS object (e.g., a representation of a valve) is dragged and dropped onto a functional target view including a GIS area map, the system automatically determines a "Zoom to" function and performs the function based on the geo-coordinates of the analog ICS object. That is, the area map zooms into the area around the ICS object's location. The zoom factor may be predefined or it may be calculated dynamically (e.g., based on the density of GIS objects around the location of the respective ICS object). In case a digital ICS object (e.g., an alarm signal) is dragged and dropped onto the area map, a "Highlight" function is performed. For example, All GIS view objects can be highlighted which are affected by a corresponding alarm signal.

The last two entries in table 400 relate to function mappings for directed associating operations being directed from a GIS object to the ICS functional view. For example, if a GIS object representing a pump is dragged and dropped onto a functional ICS view including an alarm list, a corresponding "Filter" function is performed, where the alarm list is filtered to only include such alarms that relate to the selected pump. If a GIS object representing a meter is dragged and dropped on a functional target view including an ICS process graphics, the performed "Highlight" function highlights dynamic elements that are associated with a given ICS Object (see e.g., a Pump symbol, pump flow dynamic text box, and pump status dynamic text box displayed in FIG. 6).

As a result, the further mapping data structure 400 implements a second mapping stage between an ICS functional view and a GIS functional view. In this second mapping stage the frontend system is enabled to automatically determine an appropriate function out of a plurality of functions being associated with the target functional view. In combination with the first mapping stage to determine allowed directed associating operations, the second mapping stage automatically determining the appropriate function to be performed based on the properties of the respective objects and views improves the flexibility and fault tolerance of the frontend system with regards to the interaction of the user with the system.

Figure 4:
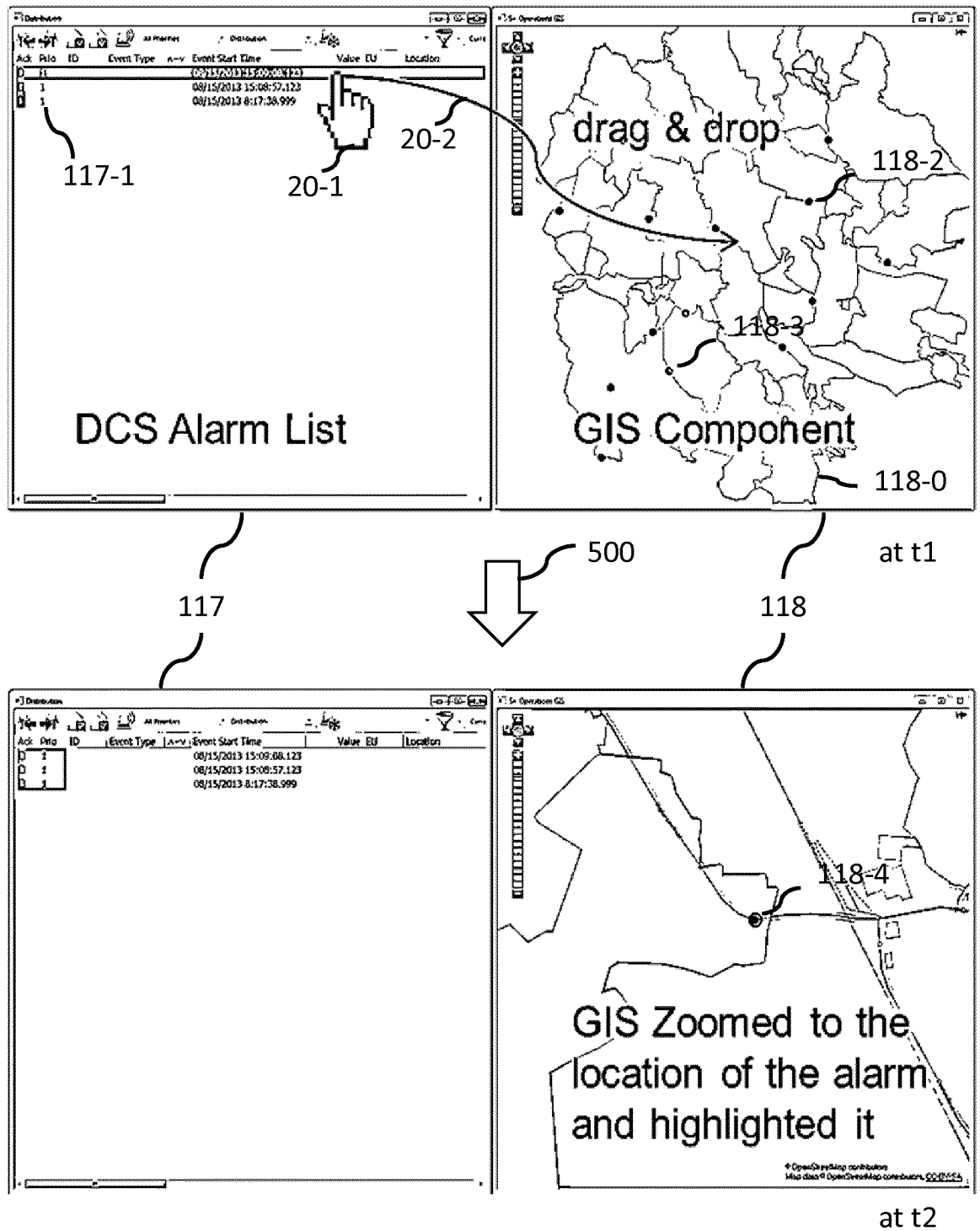
FIG. 4 illustrates a drag and drop example from a functional ICS view to a functional GIS view according one embodiment of the invention.

FIG. 4 illustrates an example of the visualization component with a functional ICS view 117 and a functional GIS view 118 representing GIS data of a GIS component, such as for example GIS 180 (cf. FIG. 1), according one embodiment of the invention. The upper part of the figure (above the arrow 500) relates to a first point in time t1. The lower part of the figure (beneath the arrow 500) relates to a second point in time t2 wherein t2>t1. In the example embodiment, the ICS view 117 relates to an alarm list 117-1 of a distributed control system (DCS). In the example, the alarm list 117-1 includes three entries. Each entry represents an alarm (that is, ICS data of the alarm type) which was raised in the underlying DCS system. An alarm list entry may include information regarding an ID, a priority of the alarm, an event type, an event start time, a value, a location or any other property which is suitable to describe and classify the respective alarm.

In the example, the directed associating operation is a drag and drop operation illustrated, at t1, by the hand icon 20-1 and the arrow 20-2 directed from the highlighted first element/object of the alarm list 117-1 to the GIS view 118. The functional GIS view 118 therefore is the target view of the drag and drop operation and includes a plurality of GIS objects which are illustrated as black bullet points in the area map 118-0. In the figure three example GIS objects out of the plurality of GIS objects are associated with the reference numbers 118-1, 118-2, 118-3. When the drag the drop operation is executed, the target view 118 automatically performs a zoom function in relation to the dragged alarm object. The lower part of FIG. 4 illustrates, at t2, the result of the executed zoom function as visualized by the visualization component after the visualization data have been updated accordingly. When the alarm object is dropped on the functional GIS view the properties of the alarm object include some reference to associated geo-coordinates. For example, the alarm data entry itself can include location data indicating where the alarm was raised. Alternatively, the alarm may indicate which DCS component raised the alarm and the respective geo-coordinates of the DCS component are retrieved.

A mapping data structure like the mapping structure disclosed in FIG. 3A may indicate that dragging and dropping an alarm element (i.e., representation of an alarm) of a DCS alarm list onto a functional GIS view is an allowed directed associating operation and, as a consequence, the zoom function of the target view is performed. An alarm belongs to an ICS object (e.g., a measurement point in a DCS system). The mapping data structure can then contain the relationship between the ICS object (i.e., Tag Name) and the corresponding GIS object (i.e., GIS Id and a GIS layer=combined primary key). The zoom function can be associated with the properties of the dragged DCS object in combination with the area map 118-0 shown by the target view. For example, the alarm element is associated with an ICS object having a unique Tag Name. That is, the location data of the ICS object (geo-coordinates) are also available for the associated alarm element. A data mapping structure similar to the one in FIG. 3A can relate the Tag Name to a GIS object/GIS Layer combination thus defining the location data for the respective GIS object. If the dragged DCS object is such an alarm element it therefore is assigned to the location data of the associated ICS object. As a result the GIS target view automatically can perform a zoom-in into the area map 118-0 around the location data associated with the alarm element/object. The origin of the alarm object 117-1 may be highlighted as a GIS object 118-4 in the GIS view. Instead of alarm objects any other ICS object (e.g., DCS field component, DCS signal, etc.) may be dropped on the target functional view and can be treated accordingly. In case multiple DCS objects are dragged and dropped, the GIS can zoom to an area large enough to illustrate the locations of all dragged objects.

For example, the GIS view function can further include a filter for displaying only GIS objects relevant to the dropped DCS object(s). For example, non-relevant GIS layers and GIS Objects can be turned off or hidden while more relevant ones may be turned on. For example, a GIS object can be relevant if there are alarms/recent events associated with the GIS object. So, by dragging objects from an alarm/event list on the GIS view, only those GIS objects having such an association are considered to be relevant. In general, the frontend system can include conditions or rules for determining whether an GIS object is to be regarded as relevant or not. For example, a counter can count the number of alarms/recent events within a predefined time interval and if the count exceeds a predefined relevancy threshold value, the object is classified as relevant.

Alternatively or in addition to zooming to a given location, the function of the functional GIS view can be configured to highlight the DCS element(s) on the GIS display (e.g., by a blinking symbol, temporarily panning the map, etc.).

The drag and drop operation can be carried out using a computer mouse, a touch screen or any other suitable input device. In situations when the drag & drop operation interferes with default application behavior (e.g., panning a map), it may be necessary to use other means to overcome the situation (e.g., hold right mouse button instead of the left one or press & hold some special key on the keyboard).

In an alternative embodiment which uses the same or similar functional views as illustrated in FIG. 4, the function performed by the GIS view 118 in response to the associating operation 20-1, 20-2 can be a visualizing filter function configured to filter out objects from the area map 118-0 which are not relevant to the at least one ICS object in the context of its properties. For example, the dragged alarm object may relate to a specific DCS field component which is represented by the GIS object 118-4. In this case, other GIS objects (e.g., 118-1, 118-2, 118-3) which are not related to the dragged alarm object (that is, which are not relevant to the alarm object in the context of its properties), may be filtered out (e.g., by suppressing their visualization in the visualization component).

Figure 5:
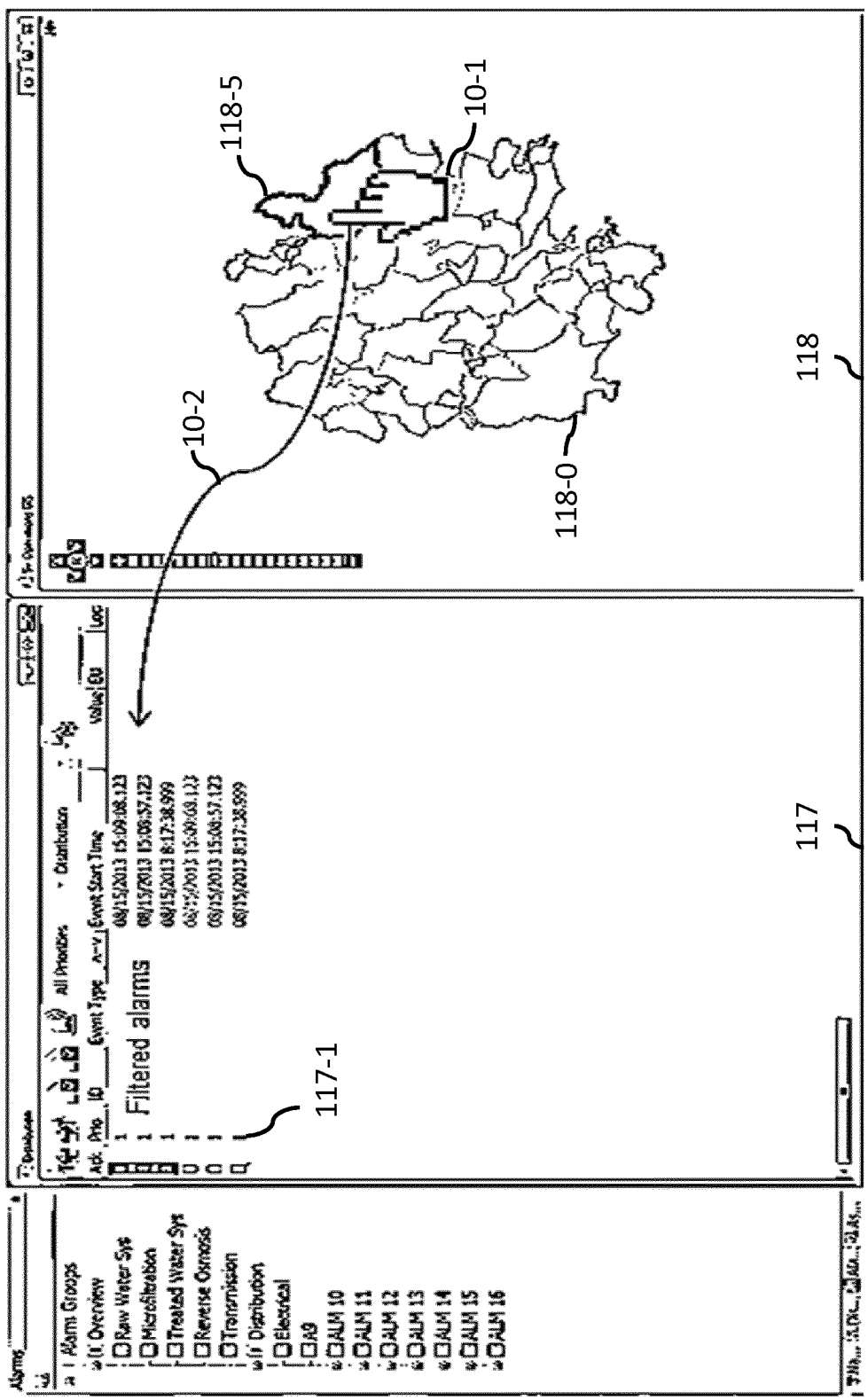
FIG. 5 illustrates a further drag and drop example from a functional GIS view to a functional ICS view according one embodiment of the invention.

FIG. 5 illustrates a further example of the visualization component for a drag and drop operation from GIS objects of the functional GIS view to a functional ICS view according to one embodiment of the invention. The further example uses the same functional views as the previous example. However, the directed associating operation is now directed from GIS objects selected 10-1 in the GIS view 118 dragged and dropped 10-2 on the functional ICS view 117. The functional ICS view corresponds to a DCS alarm list as in the previous example. Again, the GIS objects can correspond to representations of DCS components in an area map. When a GIS object (e.g., sensor symbol or symbol representing a particular DCS component) is dragged and dropped onto the DCS alarm list 117-1, the alarm list 117-1 may be filtered to display only alarm objects that are associated with signals belonging to the dragged GIS object. In the example of FIG. 5, the dragged and dropped GIS object 118-5 corresponds to a whole sub-region of the area map 118-0 described by the polygon with the highlighted boundary. In such an embodiment all GIS objects which are located in the selected sub-region 118-5 can be used as input for the filter function performed by the functional ICS view 117 on the alarm list 117-1. That is, the mapping data structure of FIG. 3 can include entries indicating that dragging and dropping GIS sub-region objects of an area map onto an alarm list is an allowed directed associating operation and that the function which is performed by the alarm list in response to the drag and drop operation is a filter function filtering the alarm list 117-1 to only include alarm entries which relate to the dragged GIS object.

In the example of FIG. 5, the ICS view 117 includes a second portion 117-2 showing a list of alarm groups. An alarm group in an ICS typically corresponds to a part of a system (e.g., geographical or functional grouping). A part of a GIS area map may correspond to an area which also defines an alarm group. In a low complexity embodiment an ICS object may only be associated with one GIS object but there can be multiple ICS objects being associated with the same GIS object (1:N relationship between GIS objects and ICS objects). In more complex embodiments, the relationship can be M:N or, alternatively, can be defined by a hierarchical relationship (e.g., a tree structure) between GIS objects. A GIS object can have a parent. For example, a pump belongs to a pumping station and the pumping station belongs to an area.

Figure 6:
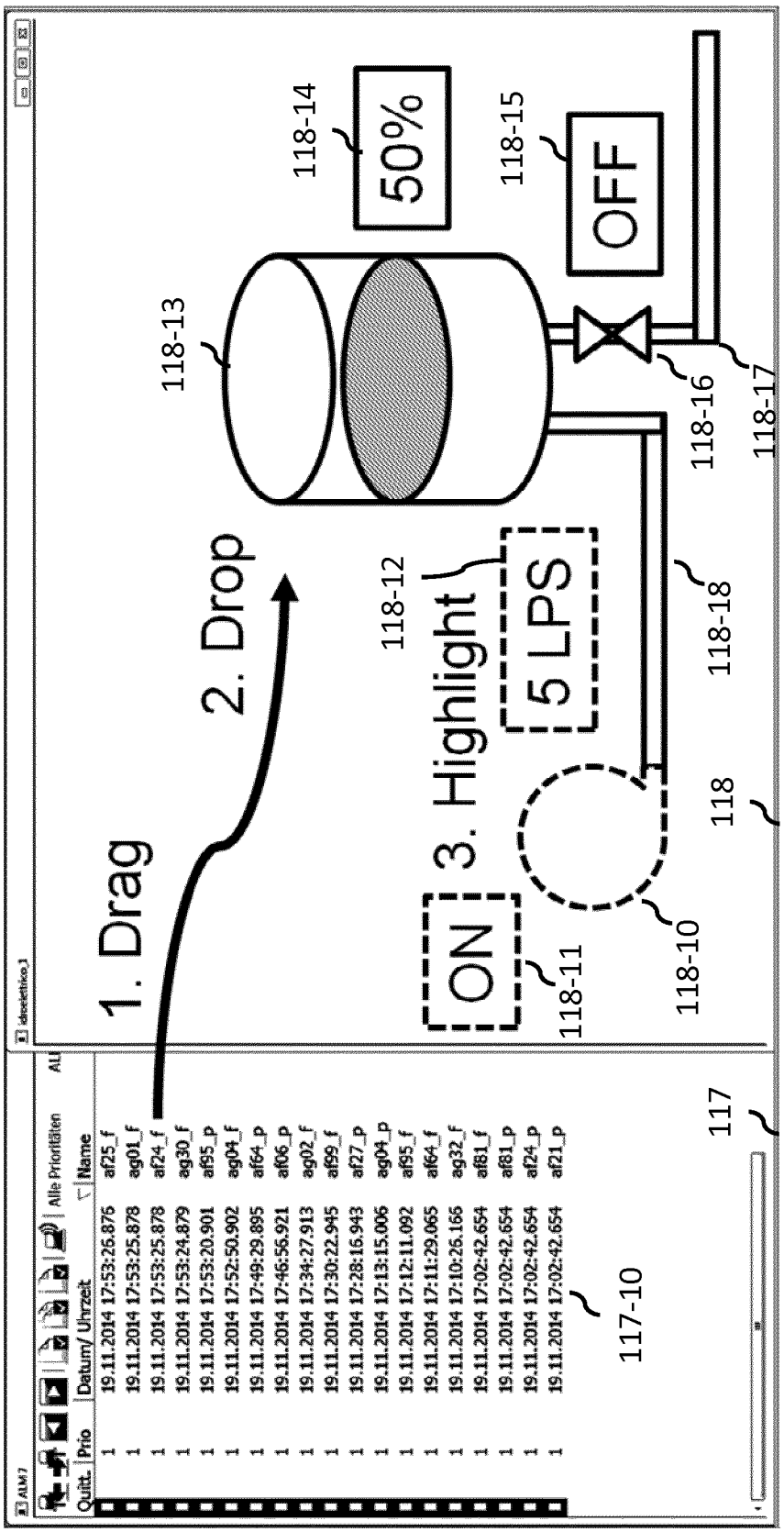
FIG. 6 illustrates a further drag and drop example from a functional ICS view to functional ICS process display view to according one embodiment of the invention.

FIG. 6 illustrates a further drag and drop example from a functional ICS view 117 to a functional ICS process display view 118 according to one embodiment of the invention. When a GIS object (e.g., sensor symbol) is dragged and dropped onto an ICS (e.g., DCS) process display/graphic, the process graphic may highlight the parts related to the GIS object. This behavior is illustrated by the example of FIG. 6. An ICS object (e.g., an alarm from the alarm list 117-10) is dragged and dropped onto the functional ICS process view 118. The functional target view 118 displays ICS objects representing field components (pump 118-10, pipes 118-17, 118-18), hydraulic cylinder 118-13, and valve 118-16) controlled or monitored by the ICS. Further ICS objects (status boxes 118-11, 118-12, 118-14, 118-15) illustrate the technical status of corresponding field components. The detected and allowed directed associating operation triggers a highlighting function associated with the functional process display view 118 (either as a default function of the target view or by dynamic determination through mapping data structures similar to the ones in FIGS. 3A, 3B). In the example the pump symbol 118-10 and two corresponding dynamic status text boxes (indicating pump flow 118-11 and its status value 118-12) are highlighted (illustrated by dashed line style) because the selected alarm element from the alarm list 117-10 relates to the pump represented by the pump symbol 118-10 and the status boxes 118-11, 118-12 are related to the pump. The highlighting can help an operator to quickly identify relevant elements in complex process graphics displays.

In one embodiment an ICS process display view may be dragged and dropped onto a functional GIS view. The GIS view may perform a zoom function to zoom into the area where the signals associated with ICS objects on the process display view are located. This allows the operator to switch between a schematic view (i.e., process display) and physical view of the system to better understand the given situation. As the GIS might contain some additional information (e.g., weather data, location of mobile units, etc.) the operator might gain a better insight as to the circumstances that led for example to an alarm that was observed in the process display view.

In the following, some further examples of directed associating operations between functional ICS views and functional GIS views are briefly disclosed. In view of the foregoing general description and specific embodiments a person skilled in the art is able to implement the corresponding mapping data structures and respective view functions.

In one embodiment, a GIS object (e.g., sensor symbol) is dragged and dropped onto an ICS (e.g., DCS) trend view. The ICS trend view can perform a function to display time series and alarms associated with the GIS object; ICS trend views are common in commercially available frontend systems. A trend view can display ICS objects such as, for example, measurement points. By querying the mapping data structure one or more ICS objects can be determined belonging to the same GIS object. The trend can then display time series of the corresponding ICS objects. For example, the measurement points (ICS objects) can relate to pressure and flow measurements of a pump. The trend view can then display the time series associated with the two ICS objects pressure and flow.

In one embodiment, dragging and dropping an ICS (e.g., DCS) element having an associated specific time stamp (e.g. an alarm, a process value, etc.) onto the GIS functional view may result in loading or restoring the GIS data 181 (cf. FIG. 1) from a data storage unit (e.g., GIS system 180) in order to display the situation at the instant described by the time stamp associated with the ICS element. For example, after the directed associating operation the functional GIS view may display all alarms that occurred in a similar time period (e.g., +/−10 minutes, hours, etc. from the initial alarm time). The GIS data can change over time. For example, this allows tracking a time stamped location of a service vehicle (technician) or a time stamped weather map (cloud/rainfall map). Under normal circumstances, the GIS functional view shows only recent data. When dragging and dropping a time-stamped ICS object (e.g., an alarm or historical alarm/event) onto the map, the functional GIS view can perform the above described data loading function and display the object locations at the time when passed events happened. This function is useful for diagnostic purposes of the ICS or for an offline analysis of a root cause of a failure. For example, it can help to identify situations like that a technician who was quite far from the site was called to investigate an issue while there was someone else working already nearby.

In one embodiment, an ICS object which is based on multiple time stamps (e.g., alarm or event) is dragged and dropped onto a functional GIS view. An ICS object being based on multiple time stamps means that for the ICS object historical data is available and for each time stamp such historical data describe a technical status of the ICS object at the respective point in time. The functional GIS view can then perform some statistical evaluation with respect to the multiple time stamps and present a corresponding representation (e.g., by changing colors, symbols, histogram, etc.). For example, an animation within the functional GIS view may be started to show the order and location of occurrences corresponding to the respective time stamps and the time elapsed between various occurrences (e.g. points in time when alarms were raised or events occurred). In other words, the animation provides a video sequence which illustrates the development of ICS objects over time in the functional GIS view at the point in time corresponding to the various time stamps. A particular application scenario for using multiple time stamps is a situation where a plurality of alarms was raised over a particular time interval. Each alarm has a time stamp corresponding to the point in time it was raised. When now dragging and dropping the plurality of alarms the functional GIS view the GIS view can perform an animation function which visualizes the order and locations of alarm occurrences and the time elapsed between the occurrences of the plurality of time stamps. Such an animation supports, for example, to perform root cause analysis of alarms.

A person skilled in the art can apply the above described concepts and embodiments to a frontend system which supports multiple screens. In such a configuration multiple functional target views may be used. For example, multiple functional GIS views may be used simultaneously on multiple screens in combination with one ICS.

In one embodiment, the functional GIS view can be used to define and alarm condition for the ICS. For example, in an area map of the functional GIS view the user can define an area of interest by, for example, drawing a geometric shape (e.g., a square, triangle, circle or any polygon). Dragging and dropping an ICS object onto the sub-area defined by the geometric shape within the GIS view may define an alarm condition that is triggered for the dropped ICS object as soon as this ICS object moves out of the defined sub-area. For example, such an embodiment can be used to monitor theft of ICS field components (e.g., sensors) communicating through wireless communication protocols.

In one embodiment, dragging and dropping an alarm from a functional source view (e.g., ICS view or a GIS view) onto an acknowledge control element (e.g., button, area, etc.) of the functional target view may acknowledge the alarm.

In one embodiment, dragging and dropping an alarm from a functional source view (e.g., ICS view or a GIS view) onto a change priority control element (e.g., one of several buttons/images/icons representing high, medium, low) of the functional target view may change the priority of the alarm.

Accordingly, mutual interaction between a DCS/SCADA view and a GIS or an ICS process view is achieved using directed associating operations in both directions. The mutual interaction can serve to perform monitoring and/or control functions on the ICS. For example, by dragging and dropping an ICS object (e.g., alarm, signal, etc.) from an alarm/signal list onto a GIS view, the GIS view can zoom into the area around the location associated with the respective ICS object as described in the context of FIG. 4. In case multiple ICS objects are dragged and dropped the GIS view can zoom into an area where the multiple objects are located. The size of such an area can be automatically calculated by the function performed by the functional GIS view in response to the directed associating operation, for example, by determining a minimum size which is needed to cover all locations of the corresponding ICS objects. In addition to zooming into the location, the area map can be centered around the GIS objects representing respective ICS objects, or the GIS object(s) can be highlighted (e.g., by a blinking symbol, a circle around the symbol, a different border color around the symbol, etc.). It is also possible to drag objects of an ICS process view onto a GIS view. The GIS may then perform a zoom function to zoom (or highlight) the area all ICS objects (e.g., signals) on the ICS process view are located.

The other interaction direction between a functional GIS view and a functional ICS view is illustrated by the example of FIG. 5. Fro example, by dragging and dropping GIS objects (e.g., sensor symbols) on an ICS signal or alarm list, the signal or alarm list may be filtered to display only signals that are associated with the corresponding GIS objects. For example, when dragging and dropping GIS objects (e.g., sensor symbols) onto an ICS process view or (e.g., a process graphic), the ICS process view may highlight the parts related to the respective GIS objects.

The functional GIS view may generally be able to respond to directed associating operation commands from other applications external to the ICS (e.g., web browser, text editor, spreadsheet application such as Microsoft Excel, etc.). By dragging a signal name or GIS object ID from any other application into a GIS view, the GIS view may be caused to zoom to or highlight the location of the corresponding GIS object in a similar way as disclosed in the context of dragging and dropping objects of the functional ICS view.

Figure 7:
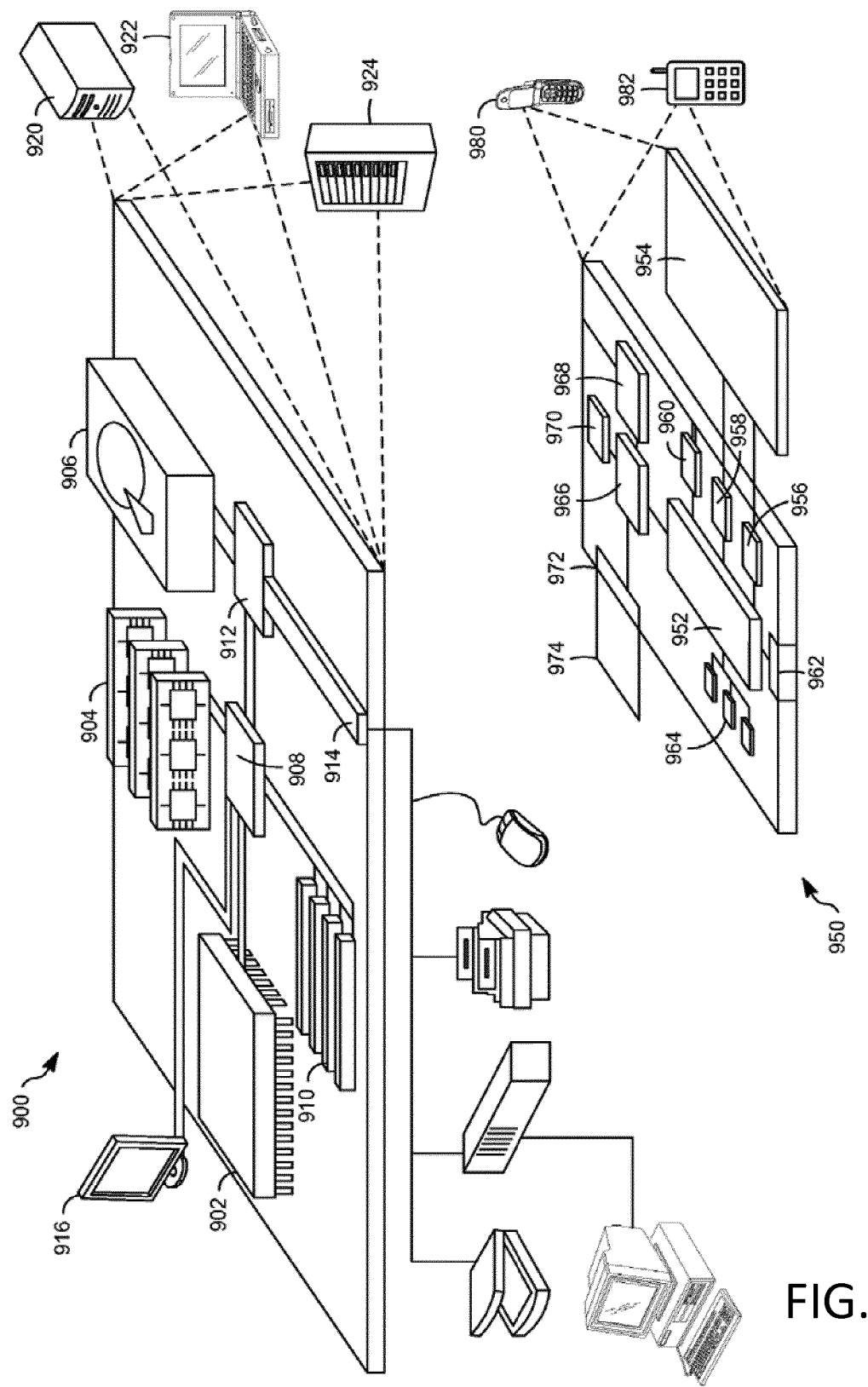
FIG. 7 is a diagram that shows an example of a generic computer device and a generic mobile computer device, which may be used with the techniques described herein.

FIG. 7 is a diagram that shows an example of a generic computer device 900 and a generic mobile computer device 950, which may be used with the techniques described here. Computing device 900 may be run the ICS and/or GIS and is intended to represent various functions of digital computers as they are also used in laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. In the context of this disclosure the computing device 950 may serve as a frontend control device of the computing device 900. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A frontend system communicating with an industrial control system (ICS), the frontend system comprising:
 a visualization component configured to concurrently visualize a functional ICS view and a further functional view, the functional ICS view being representative of ICS data associated with the industrial control system, the further functional view being a further functional ICS view representative of ICS data associated with the industrial control system, or the further functional view being a functional GIS view representative of GIS data associated with a geographic information system, the functional views being configured to perform a function in response to an associating event;
 a data input component configured to receive input data from a user, the input data indicating a first and/or second directed associating operation between the functional ICS view and the further functional view; and
 a processor component configured to
 launch the associating event in response to the received input data if the directed associating operation is allowed,
 determine a direction of the directed associating operation between the functional ICS view and the further functional view,
 if the first directed associating operation is directed from at least one object of the further functional view to the functional ICS view, perform the function associated with the functional ICS view based on one or more properties of the at least one object of the further functional view,
 if the second directed associating operation is directed from at least one ICS object of the functional ICS view to the further functional view, perform the function associated with the further functional view based on properties of the at least one ICS object, and
 update visualization data of the functional views according to the performed function.

2. The system of claim 1, wherein the first directed associating operation is a drag and drop operation, a multi-touch operation, a keyboard controlled operation, a voice controlled operation, or an eye-tracking controlled operation.

3. The system of claim 1, wherein a target view of the functional views is configured to perform further functions in response to the associating event and the function to be performed is determined based on one or more properties of the target view and one or more properties of an object of a source view of the functional views.

4. The system of claim 1, wherein a target view of the functional views is configured to perform further functions in response to the associating event and the function to be performed is determined based on user selection input data.

5. The system of claim 1, wherein the further functional view includes an area map based on the GIS data covering at least a part of the area where the at least one ICS object is located, and
 wherein the performed function associated with the area map is a zoom function configured to zoom into the area around the location of the at least one ICS object.

6. The system of claim 1, wherein the further functional view includes an area map based on the GIS data covering at least a part of the area where the at least one ICS object is located, and
 wherein the performed function associated with the area map is a visualizing filter function configured to filter out objects from the area map which are not relevant to the at least one ICS object in the context of its properties.

7. The system of claim 1, wherein the functional ICS view includes an alarm list, wherein the further functional view includes an area map including at least one GIS object which indicates the location of one or more corresponding ICS objects, and
 wherein the performed function associated with the alarm list is an alarm filter function configured to filter out elements of the alarm list which are not associated with signals represented by the one or more corresponding ICS objects.

8. The system of claim 1, wherein the functional ICS view includes an ICS trend view and the further functional view includes an area map including at least one GIS object which indicates the location of one or more corresponding ICS objects, and
 wherein the performed function associated with the ICS trend view is to display one or more time series and alarms associated with the GIS object.

9. The system of claim 1, wherein the functional ICS view includes an ICS process view,
 wherein the further functional view includes an area map including at least one GIS object which indicates the location of one or more corresponding ICS objects, and
 wherein the performed function associated with the ICS process view highlights objects of the ICS process view related to the at least one GIS object.

10. A computer implemented method for operating a front end system which communicates with an industrial control system (ICS), the method comprising:
 concurrently visualizing a functional ICS view and a further functional view, the functional ICS view being representative of ICS data associated with the industrial control system, the further functional view either being a further functional ICS view representative of ICS data associated with the industrial control system, or the further functional view being a functional GIS view representative of GIS data associated with a geographic information system, the functional views being configured to perform a function in response to an associating event;
 receiving input data from a user, the input data indicating a first and/or second directed associating operation between the functional ICS view and the further functional view;
 launching the associating event in response to the received input data if the directed associating operation is allowed;
 determining a direction of the directed associating operation between the functional ICS view and the further functional view;
 if the first directed associating operation is directed from at least one object of the further functional view to the functional ICS view, performing the function associated with the functional ICS view based on one or more properties of the at least one object of the further functional view;
if the second directed associating operation is directed from at least one ICS object of the functional ICS view to the further functional view, performing the function associated with the further functional view based on properties of the at least one ICS object; and
updating visualization data of the functional views according to the function performed.

11. The method of claim 10, wherein a target view of the functional views is configured to perform further functions in response to the associating event, and
wherein the function to be performed is determined based on one or more properties of the target view and one or more properties of an object of a source view of the functional views.

12. The method of claim 10, wherein a target view of the functional views is configured to perform further functions in response to the associating event, and
wherein the function to be performed is determined based on user selection input data.

13. The method of claim 10, wherein in case the directed associating operation is directed from the at least one ICS object of the functional ICS view to the further functional view, the further functional view being a GIS view and the at least one ICS object having a specific time stamp, the method further comprising:

loading ICS data related to the specific time stamp; and
restoring GIS data from a data storage unit in order to display a situation at the instant corresponding to the specific time stamp associated to the at least one ICS object.

14. The method of claim 10, wherein in case the second directed associating operation is directed from a plurality of ICS object of the functional ICS view to the further functional view, the functional ICS view including an alarm list, the further functional view including an area map and the plurality of ICS object including a plurality of alarm objects, each alarm object having a time stamp, the method further comprising:
playing an animation within the further functional view visualizing the order and locations of occurrences and the time elapsed between the occurrences of the plurality of time stamps.

15. The system of claim 1, wherein the first directed associating operation is a multi-touch operation.

16. The system of claim 1, wherein the first directed associating operation is a keyboard controlled operation.

17. The system of claim 1, wherein the first directed associating operation is a voice controlled operation.

18. The system of claim 1, wherein the first directed associating operation is an eye-tracking controlled operation.

* * * * *